United States Patent
Ye (10) Patent No.: US 11,375,203 B2
(45) Date of Patent: Jun. 28, 2022

(54) VIDEO PROCESSING METHOD, SYSTEM, DEVICE AND COMPUTER-READABLE STORAGE MEDIUM

(71) Applicant: Shanghai Bilibili Technology Co., Ltd., Shanghai (CN)

(72) Inventor: Tianxiao Ye, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/631,308

(22) PCT Filed: Jun. 27, 2019

(86) PCT No.: PCT/CN2019/093263
§ 371 (c)(1),
(2) Date: Jan. 15, 2020

(87) PCT Pub. No.: WO2020/155538
PCT Pub. Date: Aug. 6, 2020

(65) Prior Publication Data
US 2021/0352295 A1 Nov. 11, 2021

(30) Foreign Application Priority Data
Jan. 31, 2019 (CN) .......................... 201910097364.9

(51) Int. Cl.
*H04N 19/14* (2014.01)
*H04N 19/146* (2014.01)
(52) U.S. Cl.
CPC ........... *H04N 19/14* (2014.11); *H04N 19/146* (2014.11)

(58) Field of Classification Search
CPC .............................. H04N 19/14; H04N 19/146
(Continued)

(56) References Cited

U.S. PATENT DOCUMENTS

2018/0300839 A1* 10/2018 Appu ................... H04N 19/156

FOREIGN PATENT DOCUMENTS

| CN | 1867072 A | 11/2006 |
|---|---|---|
| CN | 103841418 A | 6/2014 |

(Continued)

OTHER PUBLICATIONS

International Patent Application No. PCT/CN2019/093263; Int'l Search Report; dated Oct. 23, 2019; 2 pages.

*Primary Examiner* — On S Mung
(74) *Attorney, Agent, or Firm* — BakerHostetler (57) ABSTRACT

Techniques for processing videos are described herein. The disclosed techniques include obtaining coding time parameters of coded frames of a video, the coding time parameters comprising a first parameter indicative of a coding time period for coding each frame under a non-waiting state and a second parameter indicative of a total time period during which each frame is in a coding process; and determining a coding complexity parameter for a frame to be coded based on the coding time parameters, wherein the determining a coding complexity parameter further comprises determining whether the coding complexity parameter is downgraded based on the second parameter, and in response to a determination that the coding complexity parameter is not downgraded, determining that the coding complexity parameter is upgraded based on the first parameter.

15 Claims, 3 Drawing Sheets

(58) Field of Classification Search
USPC .................................................. 375/240.26
See application file for complete search history.

(56) References Cited

FOREIGN PATENT DOCUMENTS

| | | |
|---|---|---|
| CN | 105120295 A | 12/2015 |
| CN | 106550269 A | 3/2017 |
| CN | 107105240 A | 8/2017 |
| CN | 108734628 A | 11/2018 |
| WO | WO 2018/063635 A1 | 4/2018 |

* cited by examiner

VIDEO PROCESSING METHOD, SYSTEM, DEVICE AND COMPUTER-READABLE STORAGE MEDIUM

CROSS-REFERENCE TO RELATED APPLICATION

The present application is the U.S. National Stage of International Application No. PCT/CN2019/093263, filed on Jun. 27, 2019, which claims priority to Chinese patent application No. 201910097364.9, filed on Jan. 31, 2019. The entire disclosure of the above-application is incorporated by reference herein and made a part of this specification.

TECHNICAL FIELD

The embodiments of the present application relate to a technical field of computer technology, and more particularly to a video processing method, system, computing device, and computer-readable storage medium.

BACKGROUND

With the application and development of video services in various fields, video codecs have become one of the key technologies that are concerned and developed by all parties. The video coding is to convert a certain video format file into another video format file through a specific compression technology. In order to continuously adapt to new requirements, international standard organizations (e.g., standard organizations such as ITU-T, IEC), have jointly developed many kinds of video coding standards in recent years, for example, H.264/AVC (advanced video coding), H.265/HEVC (high-efficiency video coding.

The existing video coding technologies usually encode video content with a single coding complexity. The video coding technologies cannot adapt to various video coding scenarios at the same time, and is prone to a problem of video playback delay and a problem of low video playback quality.

SUMMARY

The object of the embodiments of the present application is to provide a video processing method, system, computing device, and computer-readable storage medium, which is to solve the problem of video playback delay and low video playback quality caused by video coding through the existing video encoding technologies.

One aspect of the embodiments of the present application provides a video processing method, the video processing method comprising: obtaining coding time parameters of each coded frame of a video, the coding time parameters comprising a coding time period for coding each frame under a non-waiting state; and adjusting a coding complexity parameter for a frame to be coded based on the coding time parameters.

Optional, the obtaining coding the time parameters of each coded frame of the video, comprises: monitoring a coding time period of each frame obtained during a coding process; recording the coding time period of each frame obtained during the coding process into a time queue.

Optional, the adjusting the coding complexity parameter for the frame to be coded based on the coding time parameters comprises: determining whether the coding complexity parameter is to be adjusted based on the coding time periods in the time queue; and when determining to adjust the coding complexity parameter, adjusting the coding complexity parameter from a first coding complexity parameter to a second coding complexity parameter, and clearing the time queue.

Optional, the coding time parameters further comprises frame time periods; the obtaining coding the time parameters of each coded frame of the video further comprises: monitoring the coding time period of each frame and a frame time period of each frame during the coding process; recording the coding time period of each frame and the frame time period of each frame during the coding process into the time queue, to update the time queue in real-time.

Optional, the adjusting the coding complexity parameter for the frame to be coded based on the coding time parameters further comprises: determining whether the coding complexity parameter is to be adjusted to downgrade a coding complexity based on the frame time periods in the time queue; and when determining not to adjust the coding complexity parameter to downgrade the coding complexity, determining whether the coding complexity parameter is to be adjusted to upgrade the coding complexity based on the coding time periods in the time queue.

Optional, the adjusting the coding complexity parameter for the frame to be coded based on the coding time parameters further comprises: determining whether the coding complexity parameter is to be adjusted to downgrade the coding complexity based on the frame time periods in the time queue; downgrading the coding complexity parameter when determining to downgrade the coding complexity; determining whether the coding complexity parameter is to be adjusted to upgrade the coding complexity based on the coding time periods in the time queue, when determining not to downgrade the coding complexity; upgrading the coding complexity parameter when determining to upgrade the coding complexity; maintaining the coding complexity parameter when determining not to upgrade the coding complexity; wherein, the time queue is cleared when the coding complexity parameter is adjusted.

Optional, the determining whether the coding complexity parameter is to be adjusted to downgrade the coding complexity based on the frame time periods in the time queue comprises: determining an average value of the frame time periods in the time queue and obtaining an average frame time period; determining whether the average frame time period is greater than a predetermined value; downgrading the coding complexity when the average frame time period is greater than the predetermined value; determining not to downgrade the coding complexity when the average frame time period is not greater than the predetermined value.

Optional, the determining whether the coding complexity parameter is to be adjusted to upgrade the coding complexity based on the coding time periods in the time queue comprises: determining an average value of the coding time periods in the time queue and obtaining an average coding time period; determining whether the coding complexity parameter is to be adjusted to upgrade the coding complexity based on the average coding time period and a reference average coding time period; wherein, the reference average coding time period is an average time of a plurality of average coding time periods corresponding to multiple times the coding complexity parameter is downgraded.

Optional, the determining whether the coding complexity parameter is to be adjusted to upgrade the coding complexity based on the average coding time period and the reference average coding time period comprises: estimating, based on a predetermined complexity increase coefficient and the average coding time period, an average coding time period when the coding complexity is upgraded; determining whether the estimated average coding time period is less than the reference average coding time period; determining to adjust the coding complexity parameter to upgrade the coding complexity, when the estimated average coding time period is less than the reference average coding time period.

Optional, further comprising: adjusting the coding complexity parameter based on a countdown timing operation, comprising: resetting the countdown timing operation when the coding complexity parameter is adjusted or a period of the countdown timing operation has expired; adjusting the coding complexity parameter to upgrade the coding complexity when the countdown timing operation has expired.

Another aspect of the embodiments of the present application provides a video processing system, the video processing system comprising: an obtaining module, configured to obtain coding time parameters of each coded frame of a video, the coding time parameters comprising a coding time period for coding each frame under a non-waiting state; and an adjusting module, configured to adjust a coding complexity parameter for a frame to be coded based on the coding time parameters.

Optional, the obtaining module, further configured to: monitor a coding time period of each frame obtained during a coding process; a recording unit; record the coding time period of each frame obtained during the coding process into a time queue.

Optional, the adjusting module further configured to: determine whether the coding complexity parameter is to be adjusted based on the coding time periods in the time queue; an adjusting unit; when determining to adjust the coding complexity parameter, adjust the coding complexity parameter from a first coding complexity parameter to a second coding complexity parameter, and clear the time queue.

Optional, the coding time parameters further comprises frame time periods; the obtaining module, further configured to: monitor the coding time period of each frame and a frame time period of each frame obtained during the coding process; record the coding time period of each frame and the frame time period of each frame obtained during the coding process into the time queue, to update the time queue in real-time.

Optional, the adjusting module, further configured to: determine whether the coding complexity parameter is to be adjusted to downgrade the coding complexity based on the frame time periods in the time queue; downgrade the coding complexity parameter when determining to downgrade the coding complexity; determine whether the coding complexity parameter is to be adjusted to upgrade the coding complexity based on the coding time periods in the time queue, when determining not to downgrade the coding complexity; upgrade the coding complexity parameter when determining to upgrade the coding complexity; maintain the coding complexity parameter when determining not to upgrade the coding complexity; wherein, the time queue is cleared when the coding complexity parameter is adjusted.

Optional, the adjusting module, further configured to: determine an average value of the frame time periods in the time queue and obtain an average frame time period; determine whether the average frame time period is greater than a predetermined value; downgrade the coding complexity when the average frame time period is greater than the predetermined value; determine not to downgrade the coding complexity when the average frame time period is not greater than the predetermined value.

Optional, the adjusting module, further configured to: determine an average value of the coding time periods in the time queue and obtaining an average coding time period; determine whether the coding complexity parameter is to be adjusted to upgrade the coding complexity based on the average coding time period and a reference average coding time period; wherein, the reference average coding time period is an average time of a plurality of average coding time periods corresponding to multiple times the coding complexity parameter is downgraded.

Optional, the adjusting module, further configured to: estimate, based on a predetermined complexity increase coefficient and the average coding time period, an average coding time period when the coding complexity is upgraded; determine whether the estimated average coding time period is less than the reference average coding time period; determine to adjust the coding complexity parameter to upgrade the coding complexity, when the estimated average coding time period is less than the reference average coding time period.

Yet another aspect of the embodiments of the present application provides a computing device comprising a memory, a processor, and computer programs stored in the memory and executable on the processor, wherein the processor executes the computer programs for implementing steps of any one of the video processing methods as described above.

Yet another aspect of the embodiments of the present application provides a computer-readable storage medium storing computer programs that upon execution by a processor cause the processor to perform steps of any one of the video processing methods as described above.

The video processing method, system, computing device, and computer-readable storage medium provided by the embodiments of the present application can obtain an actual coding efficiency under a current coding complexity parameter based on the coding time parameters of the coded frames, so that it can adaptively determine whether the coding complexity is to be upgraded to improve the coding quality, to improve the video playback quality; or the coding complexity is to be downgraded to increase coding efficiency, to avoid the problem of the video playback latency.

DETAILED DESCRIPTION OF ILLUSTRATIVE EMBODIMENTS

To make the objectives, technical solutions and advantages of the present application more comprehensible, the present application is described in further detail below with reference to embodiments and the accompanying drawings.

It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

It should be noted that the description of "first", "second" and the like in the present application is used for the purpose of description only, and cannot be construed as indicating or implying its relative importance or implicitly indicating the number of the indicated technical features. Thus, features defining "first" or "second" may include at least one of the features, either explicitly or implicitly. In addition, the technical solutions in the embodiments can be combined with each other, but must be based on the realization of those ordinary skilled in the art, when the combinations of the technical solutions are contradictory or unrealizable, it shall be deemed that the combinations of the technical solutions do not exist and are not within the protection scope required by the present application.

Different videos may respectively correspond to a different information complexity, and different videos respectively correspond to a different computing resource during a coding process, large differences may be generated among average coding speeds of different videos when coding the videos with an identical coding complexity. In addition, in a process of coding a single video, instantaneous coding speeds also fluctuate greatly in the process of coding the entire video because of information complexities of different frames. It can be known that current video coding technology cannot adapt to various video coding scenarios at the same time, and is prone to a problem of video playback delay and a problem of low video playback quality. In order to solve the above problems, embodiments of the present application provide a video processing method, which controls instantaneous coding speeds by adjusting a coding complexity in a process of coding a certain video. Details as following.

Embodiment 1

Figure 1:
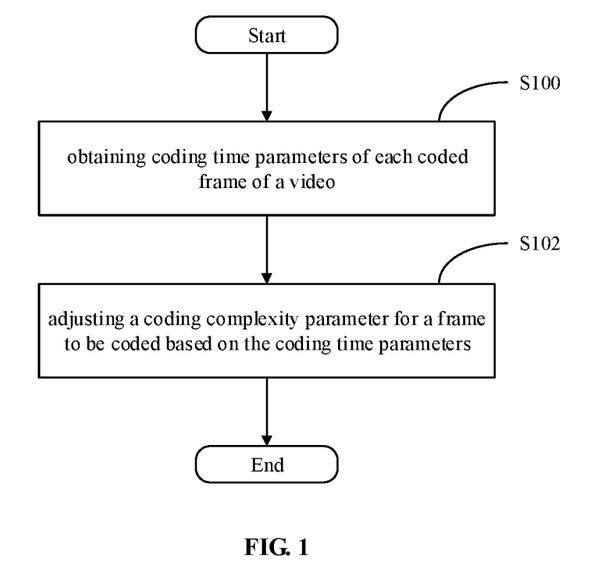
FIG. 1 illustrates a flowchart of a video processing method according to a first embodiment of the present application.

FIG. 1 illustrates a flowchart of a video processing method according to a first embodiment of the present application. It should be understood that the flowchart of the embodiment is not intended to limit the order of the steps. The method is exemplarily described below using a computing device as an executive body.

As shown in FIG. 1, the video processing method includes steps S100~S102, wherein:

At step S100, obtaining coding time parameters of each coded frame of a video.

The coding time parameters include a coding time period for coding each frame under a non-waiting state. That is, a time period it takes for the computing device to actually code one frame using computing resources such as a CPU.

In one exemplary embodiment, the obtaining the coding time parameters of the coded frames of the video, may include steps S100a~S100b: at step S100a, monitoring a coding time period of each frame during a coding process; at step S100b, recording the coding time period of each frame obtained during the coding process into a time queue, to update the time queue in real time.

A queue length of the time queue may be customized, for example, that is able to store coding time periods corresponding to 0.5 seconds, or is able to store coding time periods corresponding to 100 frames.

The time queue may be a first in first out (FIFO) queue, coding time parameters of each coded frame is stored into the time queue in coded time order. When storage space of the time queue is exhausted, coding time parameters of a subsequent coded frame are sent to the time queue, and the oldest coding time parameters stored in the time queue are deleted.

For example, if the time queue has stored a (N)-th to a (N+100)-th coding time parameters corresponding to a (N)-th to a (N+100)-th frame in coded time order, when coding time parameters of a (N+101)-th frame is generated, the time queue is updated to store the (N+1)-th to a (N+101)-th coding time parameters corresponding to the (N+1)-th to the (N+101)-th frame.

It should be noted that, the embodiments of the present application are applied to the computing device, and the computing device may be various types of electronic devices such as a mobile phone, a personnel computer, a surveillance device, a video conference system, a cloud server, or a server cluster. To facilitate understanding, the following describes an application scenario of the embodiment of the present application, and it should be understood that the application scenario described in the embodiment of the present application is only an example, which is not limiting. Taking the computing device as a video conference system as an example, in the application scenario of the embodiment of the present application, after receiving original videos from parties, the video conference system needs to code the original videos using an H.265/HEVC and distribute H.265/HEVC videos to the parties. It should be understood, the video conference system has limited codec capability, coding each frame of the original videos with a higher coding complexity may affect a coding efficiency, thereby causing a video playback delay; coding each frame of the original videos with a lower coding complexity may affect image quality. As described above, the video conference system in the embodiment is able to adaptively adjust the coding complexity for the original videos according to the computing power at the time, so as to achieve a dynamic balance between the coding complexity and the coding efficiency. One way of adaptively adjusting the coding complexity for the original videos according to the computing power at the time is to determine whether the computing power at the time supports an increase of the coding complexity according to the coding time parameters of parts of coded frames in the original videos. In addition, an initial coding complexity can be customized when the video conference system receives the original videos for the first time.

At step S102, adjusting a coding complexity parameter for a frame to be coded based on the coding time parameters.

In one exemplary embodiment, the adjusting the coding complexity parameter for the frame to be coded based on the coding time parameters may include steps S102a~S102b: at step S102a, determining whether the coding complexity parameter is to be adjusted based on the coding time periods in the time queue; at step S102b, when determining to adjust the coding complexity parameter, adjusting the coding complexity parameter from a first coding complexity parameter to a second coding complexity parameter according to the coding time periods in the time queue and clearing the time queue.

For example, calculating an average value of all coding time periods in the time queue, determining whether the computing device can support a video coding operation under a current coding complexity through the average value. The determination basis may be customized, such as a predefined threshold value or the like.

The video processing method provided in embodiment 1 of the present application can obtain an actual coding efficiency under a current coding complexity parameter based on the coding time parameters of the coded frames, so that it can adaptively determine whether the coding complexity is to be upgraded to improve the coding quality, to improve the video playback quality; or the coding complexity is to be downgraded to increase coding efficiency, to avoid the problem of the video playback latency.

In addition, the video processing method provided in embodiment 1 of the present application, because the coding complexity parameters are dynamically adjusted, enables multiple coding instances to simultaneously code and share an identical computing resource pool, which increases the number of simultaneous coding instances and increase a calculation utilization of resources.

Embodiment 2

Figure 2:
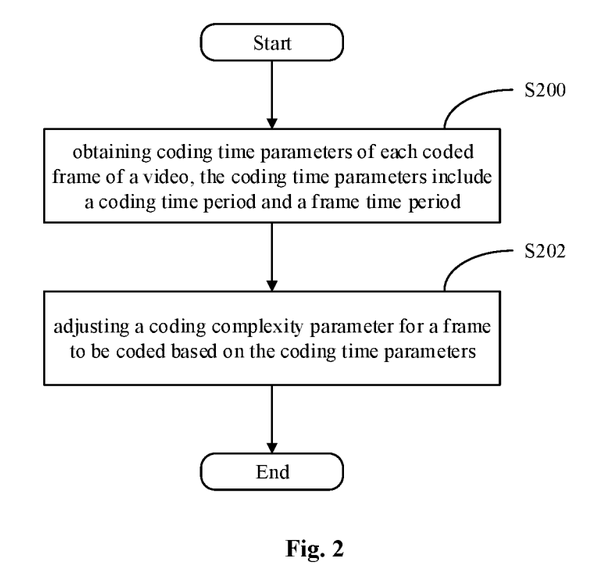
FIG. 2 illustrates a flowchart of a video processing method according to a second embodiment of the present application.

FIG. 2 illustrates a flowchart of a video processing method according to a second embodiment of the present application. The video processing method includes steps S200~S202, wherein:

At step S200, obtaining coding time parameters of each coded frame of a video, the coding time parameters include a coding time period and a frame time period.

The coding time period is a use time of coding one frame under a non-waiting state.

The frame time period is a total time for coding one frame and is an important consideration for evaluating performance.

The frame time period may be a reciprocal of a frame rate, and is a physical time of one frame from being sent into a processor (such as a codec unit) to being compressed successfully and sent out of the processor.

In order to facilitate understanding, the following briefly distinguishes the coding time period ctu_time and the frame time period frame_time:

(1) when coding one frame using one thread:

frame_time≈ctu_time+a pre-analysis time+a waiting time of coding the frame;

(2) when coding one frame using multiple threads:

frame_time≈ctu_time/the number of the multiple threads+a pre-analysis time+a waiting time of coding the frame;

It should be noted, the above is only an exemplary definition of a relationship between the coding time period and the frame time period, and is not used to limit the relationship between the coding time period and the frame time period.

In one exemplary embodiment, the obtaining the coding time parameters of the coded frames of the video, may include steps S200a~S200b: at step S200a, monitoring the coding time period of each frame and a frame time period of each frame during the coding process; at step S200b, recording the coding time period of each frame and the frame time period of each frame during the coding process into a time queue. The time queue is a first in first out (FIFO) queue, coding time parameters of each coded frame is sent into the time queue in coded time order.

At step S202, adjusting a coding complexity parameter for a frame to be coded based on the coding time parameters.

In one exemplary embodiment, the coding time periods may be used to determine whether the coding complexity parameter is to be adjusted to upgrade a coding complexity.

The frame time periods may be used to determine whether the coding complexity parameter is to be adjusted to downgrade the coding complexity.

The adjusting the coding complexity parameter for the frame to be coded based on the coding time parameters, may include comprises steps S202a~S202b: at step S202a, determining whether the coding complexity parameter is to be adjusted to downgrade a coding complexity based on the frame time periods in the time queue; at step S202b, when determining not to adjust the coding complexity parameter to downgrade the coding complexity, determining whether the coding complexity parameter is to be adjusted to upgrade the coding complexity based on the coding time periods in the time queue.

It should be understood:

A coding time period can be used as a basis for determining whether to upgrade a coding complexity because the coding time period indicates a time period for coding one frame under a non-waiting state.

A frame time period can be used as a basis for determining whether to downgrade a coding complexity: under a premise of a given frame rate, such as 50 frames per second, if an actual frame rate is 40, coding one frame needs 0.025 seconds on average (that is, an average value of frame time periods corresponding to each frame in one second), it means that a current computing capability of the computing device cannot support a video coding operation under a current coding complexity parameter, so the coding complexity parameter needs to be adjusted to downgrade the coding complexity, thereby ensuring the coding efficiency.

A frame time period cannot be used as a basis for determining whether to upgrade the coding complexity: assuming that a current computing capability of the computing device can support 80 frames per second, theoretically, it takes 0.0125 seconds per coding one frame. However, the frame rate is constant, that is, 50 frames are input to a processor (a coding unit) per second on a given frame rate as a precondition, so in fact it actually takes 0.02 seconds per frame on average (ie, the average value of the frame time periods corresponding to frames is always greater than or equal to 0.02 seconds), which cannot reflect whether the current computing capability of the computing device can support a video coding operation with a higher coding complexity.

Embodiment 3

Figure 3:
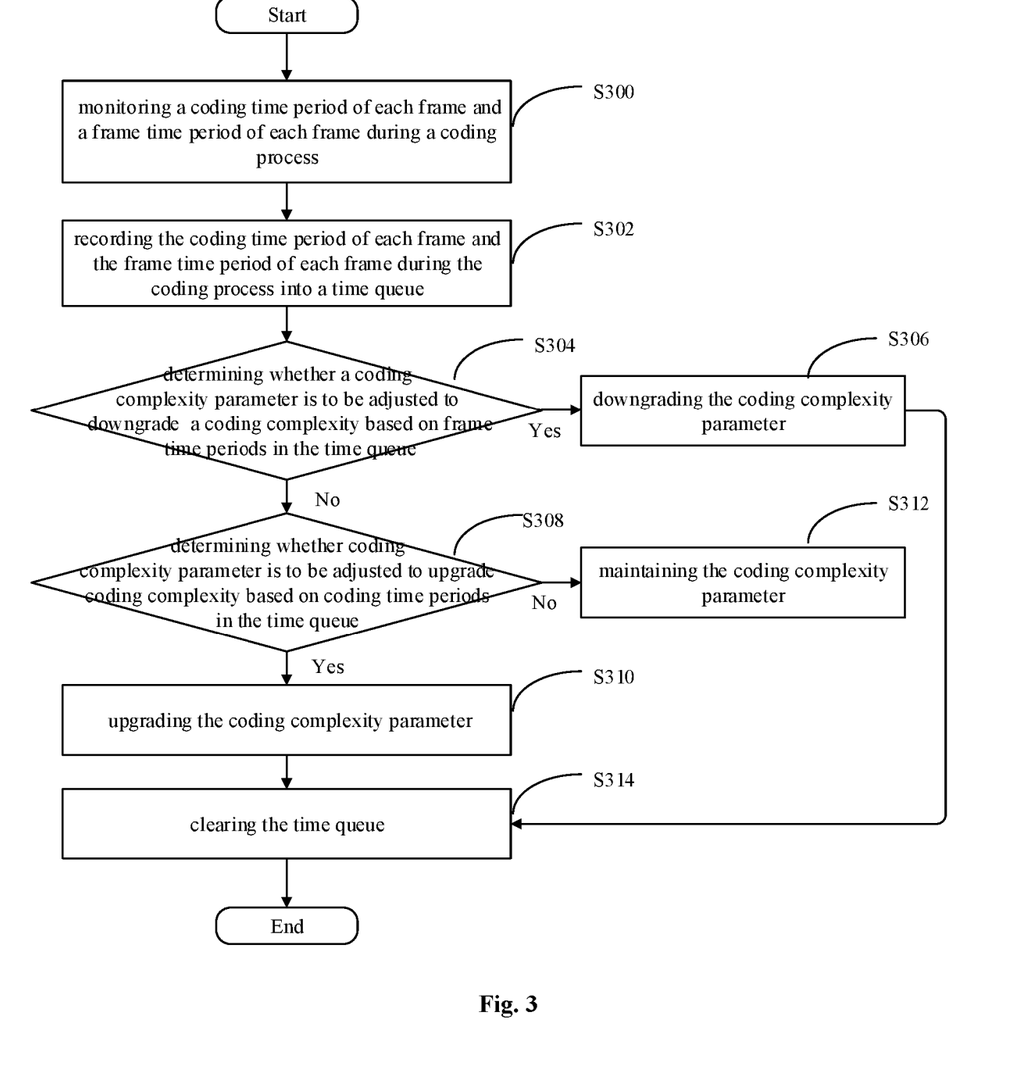
FIG. 3 illustrates a flowchart of a video processing method according to a third embodiment of the present application.

FIG. 3 illustrates a flowchart of a video processing method according to a third embodiment of the present application. The video processing method includes steps S300~S302, wherein:

At step S300, monitoring a coding time period of each frame and a frame time period of each frame during a coding process.

The coding time period is a use time period of coding one frame under a non-waiting state.

The frame time period is a time period for coding one frame.

At step S302, recording the coding time period of each frame and the frame time period of each frame during the coding process into a time queue. The time queue is a first in first out (FIFO) queue, coding time parameters of each coded frame is sent into the time queue in coded time order.

At step S304, determining whether a coding complexity parameter is to be adjusted to downgrade a coding complexity based on frame time periods in the time queue. If yes, proceed to step S306; otherwise, proceed to step S308.

In one exemplary embodiment, the step S304 may include S304a~S304d.

At step S304a, determining an average value of the frame time periods in the time queue and obtaining an average frame time period.

At step S304b, determining whether the average frame time period is greater than a predetermined value. If yes, proceed to step S304c; otherwise, proceed to step S304d.

In one exemplary embodiment, before determining whether the average frame time period is greater than the predetermined value, the flowchart may further include: determining whether coding complexity parameter of each thread for coding operations at this time has been updated to a coding complexity parameter indicated by the last adjustment instruction; if the coding complexity parameter of each thread has been updated to the coding complexity parameter indicated by the last adjustment instruction, proceed to step S304b; otherwise, suspend not performing step S304 until the coding complexity parameter has been updated.

At step S304c, determining to downgrade the coding complexity. Proceed to step S306.

At step S304d, determining not to downgrade the coding complexity. Proceed to step S308.

At step S306, downgrading the coding complexity parameter. Proceed to step S314.

It should be noted that the step S306 is to reduce the coding complexity when coding frame to be coded.

At step S308, determining whether the coding complexity parameter is to be adjusted to upgrade the coding complexity based on the coding time periods in the time queue. If yes, proceed to step S310; otherwise, proceed to step S312.

In one exemplary embodiment, the step S308 may include steps S308a~S308b.

At step S308a, determining an average value of the coding time periods in the time queue and obtaining an average coding time period.

At step S308b, determining whether the coding complexity parameter is to be adjusted to upgrade the coding complexity based on the average coding time period and a reference average coding time period.

Wherein, the reference average coding time period is an average time of a plurality of average coding time periods corresponding to multiple times the coding complexity parameter is downgraded. Specify, the specific step of obtaining the reference average coding time period may include steps of: monitoring an average coding time period of coding time periods in the time queue each time the coding complexity parameter is downgraded; recording the average coding time period of coding time periods in the time queue each time the coding complexity parameter is downgraded into a reference queue, to update the reference queue in real-time.

A queue length of the reference queue may be customized, for example, that can store 10 average coding time periods. The reference queue may be a first in first out queue. When storage space of the reference queue is exhausted, the oldest average coding time period stored in the time queue are deleted, and the latest average coding time period is added.

In alternative embodiments, if the average coding time period is greater than or equal to the reference average coding time period, it's indicated that a large change generates between a current coding state and a previous coding state, that is, the reference average time period no longer has reference significance, thus the reference average coding time period needs to be reset in the case, for example, the reference average coding time period is reset to null.

In alternative embodiments, the step S308b may include: estimating, based on a predetermined complexity increase coefficient and the average coding time period, an average coding time period when the coding complexity is upgraded; determining whether the estimated average coding time period is less than the reference average coding time period; determining to adjust the coding complexity parameter to upgrade the coding complexity, when the estimated average coding time period is less than the reference average coding time period.

The predetermined complexity increase coefficient is a pre-configured complexity increase coefficient between coding complexities. For example, compared with a first coding complexity, a second coding complexity has a higher coding complexity, which can be quantified to be 1.2 times a coding complexity of the second coding complexity than the first coding complexity, thus the complexity increase coefficient is 1.2 when the coding complexity is adjusted from the first coding complexity to the second coding complexity.

Exemplary, the estimated average coding time period is a result of multiplying the predetermined complexity increase coefficient and the average coding time period.

It should be noted that, when the coding complexity parameter is adjusted during a countdown timing operation, the countdown timing operation is reset.

At step S310, upgrading the coding complexity parameter. Proceed to step S314.

It should be noted that, the step S310 is configured to upgrade the coding complexity of the frame to be coded.

At step S312, maintaining the coding complexity parameter.

At step S314, clearing the time queue.

That is, when the coding complexity parameter is adjusted, the time queue is cleared.

In an alternative embodiment, the video processing method may include steps of adjusting the coding complexity parameter based on a countdown timing operation. Specifically, it may include:

resetting the countdown timing operation when the coding complexity parameter is adjusted or the countdown timing operation has expired; adjusting the coding complexity parameter to upgrade the coding complexity when the countdown timing operation has expired. And, in this case, the reference queue is cleared, and the reference average coding time period is reset.

Embodiment 4

Figure 4:
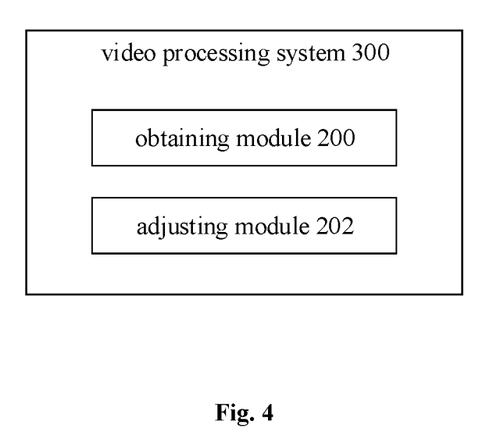
FIG. 4 illustrates a diagram of a video processing system according to a fourth embodiment of the present application.

FIG. 4 illustrates a diagram of a video processing system according to a fourth embodiment of the present application, the video processing system may be divided into one or more program modules, which are stored in a medium, and executed by one or more processors to accomplish the embodiment of the present application. The program modules referred to in the embodiment of the present application refers to a series of computer program instruction segments capable of accomplishing specific functions, and is more suitable for describing execution process of the video processing system in the medium than the program itself. The following description will specifically describe the functions of the program modules of the embodiment.

As shown in FIG. 4, the video processing system may include the following components:

an obtaining module 200 obtains coding time parameters of each coded frame of a video;

the coding time parameters comprising a coding time period for coding each frame under a non-waiting state;

an adjusting module 202 adjusts a coding complexity parameter for a frame to be coded based on the coding time parameters.

In one exemplary embodiment, the obtaining module 200 includes: a monitoring unit, configured to monitor a coding time period of each frame obtained during a coding process; a recording unit, configured to record the coding time period of each frame obtained during the coding process into a time queue.

In one exemplary embodiment, the adjusting module 202 includes: a determining unit, configured to determine whether the coding complexity parameter is to be adjusted based on the coding time periods in the time queue; an adjusting unit, configured to a adjust the coding complexity parameter from a first coding complexity parameter to a second coding complexity parameter, and clear the time queue, when determining to adjust the coding complexity parameter.

In one exemplary embodiment, the coding time parameters further comprises frame time periods; the monitoring unit is further configured to monitor the coding time period of each frame and a frame time period of each frame during the coding process; the recording unit is further configured to record the coding time period of each frame and the frame time period of each frame obtained during the coding process into the time queue, to update the time queue in real-time.

In one exemplary embodiment, the adjusting module 202 includes: a first determining unit, configured to determine whether the coding complexity parameter is to be adjusted to downgrade a coding complexity based on the frame time periods in the time queue; a second determining unit, configured to determine whether the coding complexity parameter is to be adjusted to upgrade the coding complexity based on the coding time periods in the time queue, when determining not to adjust the coding complexity parameter to downgrade the coding complexity.

In one exemplary embodiment, the adjusting module 202 includes a first adjusting unit, a second adjusting unit, a third adjusting unit and a clearing unit; the first determining unit is further configured to determine whether the coding complexity parameter is to be adjusted to downgrade the coding complexity based on the frame time periods in the time queue; the first adjusting unit is configured to downgrade the coding complexity parameter when determining to downgrade the coding complexity; the second determining unit is further configured to determine whether the coding complexity parameter is to be adjusted to upgrade the coding complexity based on the coding time periods in the time queue, when determining not to downgrade the coding complexity; the second adjusting unit is configured to upgrade the coding complexity parameter when determining to upgrade the coding complexity; the third adjusting unit is further configured to maintain the coding complexity parameter when determining not to upgrade the coding complexity; the clearing unit is configured to clear the time queue when the coding complexity parameter is adjusted.

In one exemplary embodiment, the first determining unit includes: a first calculating sub-unit, configured to determine an average value of the frame time periods in the time queue and obtain an average frame time period; a first judgement sub-unit, configured to determine whether the average frame time period is greater than a predetermined value; a first determining sub-unit, configured to downgrade the coding complexity when the average frame time period is greater than the predetermined value; a second determining sub-unit, configured to determine not to downgrade the coding complexity when the average frame time period is not greater than the predetermined value.

In one exemplary embodiment, the second determining unit includes: a second calculating sub-unit, configured to determine an average value of the coding time periods in the time queue and obtaining an average coding time period; a third determining sub-unit, configured to determine, based on the average coding time period and a reference average coding time period, whether the coding complexity parameter is to be adjusted to upgrade the coding complexity; wherein, the reference average coding time period is an average time of a plurality of average coding time periods corresponding to multiple times the coding complexity parameter is downgraded.

In one exemplary embodiment, the third determining sub-unit is configured to estimate, based on a predetermined complexity increase coefficient and the average coding time period, an average coding time period when the coding complexity is upgraded; determine whether the estimated average coding time period is less than the reference average coding time period; determine to adjust the coding complexity parameter to upgrade the coding complexity, when the estimated average coding time period is less than the reference average coding time period.

In one exemplary embodiment, further includes a countdown timing module, configured to adjust the coding complexity parameter based on a countdown timing operation. The countdown timing module is further configured to reset the countdown timing operation when the coding complexity parameter is adjusted or a period of the countdown timing operation has expired; adjust the coding complexity parameter to upgrade the coding complexity when the countdown timing operation has expired.

Embodiment 5

Figure 5:
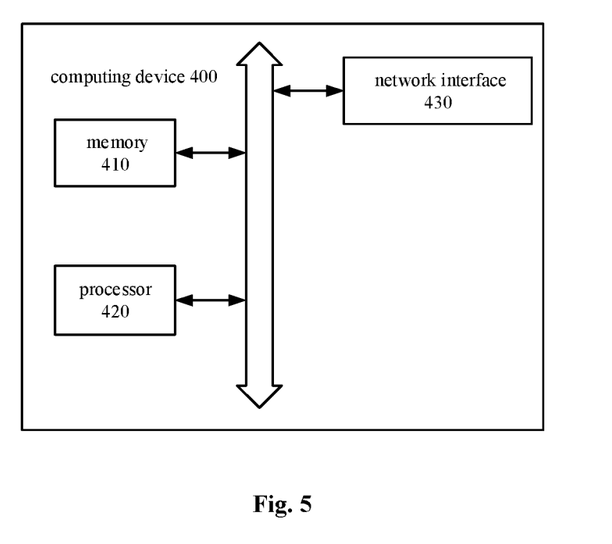
FIG. 5 illustrates a diagram of hardware architecture of a computing device suitable for implementing a video processing method according to a fifth embodiment of the present application.

FIG. 5 illustrates a diagram of hardware architecture of a computing device suitable for implementing a video processing method according to a fifth embodiment of the present application. In the embodiment, the computing device 400 is a device capable of automatically performing numerical calculations and/or information processing according to predefined or stored instructions. For example, computing device 400 can be a Smartphone, tablet, laptop, desktop computer, surveillance device, video conference system, rack server, blade server, tower server, or cabinet server (including stand-alone servers, or a cluster of multiple servers), and so on. As shown in FIG. 5, the computing device 400 includes, but is not limited to, a memory 410, a processor 420, and a network interface 430 that can be communicated with each other through a system bus. Wherein:

The memory 410 includes at least one type of computer-readable storage medium. The readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the memory 410 may be an internal storage module of the computing device 400 such as a hard disk or memory of the computing device 400. In other embodiments, the memory 410 may also be an external storage device of the computing device 400, such as a plugged hard disk provided on the computing device 400, a smart media card (SMC), secure digital (SD) card, a flash memory card, and the like. Of course, the memory 410 may also include both an internal storage module and an external storage device of the computing device 400. In the embodiment, the memory 410 is generally used to store an operating system and various types of application software installed in the computing device 400 such as program codes of the video processing method and the like. In addition, the memory 410 may also be used to temporarily store various types of data that have been or will be outputted.

The processor 420, in some embodiments, may be a central processing unit (CPU), a controller, a microprocessor, or other data processing chip. The processor 420 is generally used to control the overall operation of the computing device 400 such as performing control and processing related to data interaction or communication with the computing device 400. In the embodiment, the processor 420 is used to run program code stored in the memory 410 or process data.

The network interface 430 may include a wireless network interface or a wired network interface which is generally used to establish a communication connection between the computing device 400 and other computing devices. For example, the network interface 430 is used for connecting the computing device 400 to an external terminal via a network and establishing a data transmission channel and a communication connection between the computing device 400 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 5 shows only a computing device 400 having components 410-430, but it is understood that it is not required to implement all of the shown components and that more or fewer parts can be implemented in lieu thereof.

In the embodiment, a video processing method stored in the memory 410 may be divided into one or more program modules and executed by one or more processors (processor 410 in the embodiment) to complete the present application.

The embodiment provides a computer-readable storage medium, which stores one or more computer programs, the one or more programs can be executed by at least one processor, to cause the at least one processor to implement steps of the video processing method in the embodiment.

In the embodiment, the computer-readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the computer-readable storage medium may be an internal storage module of the computing device 2 such as a hard disk or memory of the computing device 2. In other embodiments, the memory 610 may also be an external storage device of the computing device 2, such as a plugged hard disk provided on the computing device, a smart media card (SMC), secure digital (SD) card, a flash memory card, and the like. Of course, the computer-readable storage medium may also include both an internal storage module and an external storage device of the computing device. In the embodiment, the computer-readable storage medium is generally used to store an operating system and various types of application software installed in the computing device 2 such as program codes of the connection control method and the like. In addition, the memory 610 may also be used to temporarily store various types of data that have been or will be outputted.

Apparently, it should be appreciated by those skilled in the art that each module or step described in the embodiment of the present application can be realized by a general-purpose and that the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules, or several of the modules or steps are formed into integrated circuit modules. Therefore, the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A computer-implemented method of processing videos, comprising:
   obtaining coding time parameters of each frame of a video that has been coded, the video comprising a plurality of frames, wherein the coding time parameters comprises a first parameter indicative of a coding time period for coding each frame under a non-waiting state, wherein the coding time parameters further comprises a second parameter indicative of a total time period during which each frame is in a coding process, and wherein the obtaining coding time parameters of each frame of a video that has been coded further comprises:
      monitoring the first parameter of each frame and the second parameter of each frame during the coding process,
      recording the first parameter of each frame and the second parameter of each frame obtained during the coding process into a time queue, and
      updating the time queue in real-time; and
   determining a coding complexity parameter for a frame to be coded among the plurality of the frames based on the coding time parameters, wherein the determining a coding complexity parameter for a frame to be coded further comprises:
      determining whether the coding complexity parameter is downgraded based on the second parameter, and
      in response to a determination that the coding complexity parameter is not downgraded, determining that the coding complexity parameter is upgraded based on the first parameter; and
   wherein the determining a coding complexity parameter for a frame to be coded based on the coding time parameters further comprises:
      determining whether the coding complexity parameter is to be adjusted based on the first parameters in the time queue, and
      in response to a determination of adjusting the coding complexity parameter, changing the coding complexity parameter from a first coding complexity parameter to a second coding complexity parameter and clearing the time queue.

2. The computer-implemented method of claim 1, wherein the determining a coding complexity parameter for a frame that is to be coded based on the coding time parameters further comprises:
  determining whether the coding complexity parameter is adjusted to downgrade the coding complexity based on the second parameters in the time queue;
  downgrading the coding complexity parameter in response to a determination of downgrading the coding complexity;
  determining, in response to a determination of not downgrading the coding complexity parameter, whether the coding complexity parameter is to be adjusted to upgrade the coding complexity based on the first parameters in the time queue;
  upgrading the coding complexity parameter in response to a determination of upgrading the coding complexity;
  clearing the time queue when the coding complexity parameter is adjusted.

3. The computer-implemented method of claim 2, wherein the determining whether the coding complexity parameter is to be adjusted to downgrade the coding complexity based on the second parameters in the time queue comprises:
  determining an average value of the second parameters in the time queue and obtaining an average second parameter;
  determining whether the average second parameter is greater than a predetermined value;
  downgrading the coding complexity in response to a determination that the average second parameter is greater than the predetermined value.

4. The computer-implemented method of claim 2, wherein the determining whether the coding complexity parameter is to be adjusted to upgrade the coding complexity based on the first parameters in the time queue comprises:
  determining an average value of the first parameters in the time queue and obtaining an average first parameter;
  determining whether the coding complexity parameter is to be adjusted to upgrade the coding complexity based on the average first parameter and a reference average coding time period, wherein the reference average coding time period is an average value of a plurality of average first parameters corresponding to a plurality of times when the coding complexity parameter is downgraded.

5. The computer-implemented method of claim 4, wherein the determining whether the coding complexity parameter is to be adjusted to upgrade the coding complexity based on the average first parameter and the reference average coding time period further comprises:
  estimating, based on a predetermined complexity increase coefficient and the average first parameter, an average coding time period when the coding complexity is upgraded;
  determining whether the estimated average coding time period is less than the reference average coding time period;
  determining to adjust the coding complexity parameter to upgrade the coding complexity in response to a determination that the estimated average coding time period is less than the reference average coding time period.

6. The computer-implemented method of claim 5, further comprising: adjusting the coding complexity parameter based on a countdown timing operation.

7. A computing system of processing videos, comprising:
  at least one processor; and
  at least one memory communicatively coupled to the at least one processor and storing instructions that upon execution by the at least one processor cause the computing system to:
  obtain coding time parameters of each frame of a video that has been coded, the video comprising a plurality of frames, wherein the coding time parameters comprises a first parameter indicative of a coding time period for coding each frame under a non-waiting state, and the coding time parameters further comprises a second parameter indicative of a total time period during which each frame was in a coding process; and
  determine a coding complexity parameter for a frame to be coded among the plurality of the frames based on the coding time parameters, wherein determining a coding complexity parameter for a frame to be coded further comprises:
    determining whether the coding complexity parameter is downgraded based on the second parameter, and
    in response to a determination that the coding complexity parameter is not downgraded, determining that the coding complexity parameter is upgraded based on the first parameter;
  wherein the at least one memory further stores instructions that upon execution by the at least one processor cause the computing system to:
    monitor the first parameter of each frame and the second parameter of each frame during the coding process,
    record the first parameter of each frame and the second parameter of each frame obtained during the coding process into a time queue, and
    update the time queue in real-time;
  wherein the at least one memory further stores instructions that upon execution by the at least one processor cause the computing system to:
    determine whether the coding complexity parameter is to be adjusted based on the first parameters in the time queue, and
    in response to a determination of adjusting the coding complexity parameter, changing the coding complexity parameter from a first coding complexity parameter to a second coding complexity parameter and clearing the time queue.

8. The computing system of claim 7, wherein the at least one memory further stores instructions that upon execution by the at least one processor cause the computing system to:
  determine whether the coding complexity parameter is to be adjusted to downgrade the coding complexity based on the second parameters in the time queue;
  downgrade the coding complexity parameter in response to a determination of downgrading the coding complexity;
  determine, in response to a determination of not downgrading the coding complexity, whether the coding complexity parameter is to be adjusted to upgrade the coding complexity based on the first parameters in the time queue;
  upgrade the coding complexity parameter in response to a determination of upgrading the coding complexity;
  clear the time queue when the coding complexity parameter is adjusted.

9. The computing system of claim 8, wherein the at least one memory further stores instructions that upon execution by the at least one processor cause the computing system to:

determine an average value of the second parameters in the time queue and obtaining an average second parameter;

determine whether the second parameter is greater than a predetermined value;

downgrade the coding complexity in response to a determination that the average second parameter is greater than the predetermined value.

10. The computing system of claim 8, wherein the at least one memory further stores instructions that upon execution by the at least one processor cause the computing system to:

determine an average value of the first parameters in the time queue and obtain an average first parameter;

determine whether the coding complexity parameter is to be adjusted to upgrade the coding complexity based on the average first parameter and a reference average coding time period; wherein the reference average coding time period is an average value of a plurality of average first parameters corresponding to a plurality of times when the coding complexity parameter is downgraded.

11. The computing system of claim 10, wherein the at least one memory further stores instructions that upon execution by the at least one processor cause the computing system to:

estimate, based on a predetermined complexity increase coefficient and the average first parameter, an average coding time period when the coding complexity is upgraded;

determine whether the estimated average coding time period is less than the reference average coding time period; and determine to adjust the coding complexity parameter to upgrade the coding complexity, in response to a determination that the estimated average coding time period is less than the reference average coding time period.

12. A non-transitory computer-readable storage medium storing computer-readable instructions that upon execution by a processor cause the processor to perform operations, the operations comprising:

obtaining coding time parameters of each frame of a video that has been coded, the video comprising a plurality of frames, wherein the coding time parameters comprises a first parameter indicative of a coding time period for coding each frame under a non-waiting state, wherein the coding time parameters further comprises a second parameter indicative of a total time period during which each frame was in a coding process, and wherein the obtaining coding time parameters of each frame of a video that has been coded further comprises:

monitoring the first parameter of each frame and the second parameter of each frame during the coding process, recording the first parameter of each frame and the second parameter of each frame obtained during the coding process into a time queue, and updating the time queue in real-time; and determining a coding complexity parameter for a frame to be coded among the plurality of the frames based on the coding time parameters, wherein the determining the coding complexity parameter for a frame to be coded further comprises:

determining whether the coding complexity parameter is downgraded based on the second parameter, and in response to a determination that the coding complexity parameter is not downgraded, determining that the coding complexity parameter is upgraded based on the first parameter;

wherein the determining a coding complexity parameter for a frame to be coded based on the coding time parameters further comprises:

determining whether the coding complexity parameter is to be adjusted based on the first parameters in the time queue, and in response to a determination of adjusting the coding complexity parameter, changing the coding complexity parameter from a first coding complexity parameter to a second coding complexity parameter and clearing the time queue.

13. The computer-implemented method of claim 6, further comprising:

resetting the countdown timing operation when the coding complexity parameter has been adjusted or a period of the countdown timing operation has expired.

14. The non-transitory computer-readable storage medium of claim 12, wherein the operations further comprise:

determining an average value of the second parameters recorded in the time queue and obtaining an average second parameter;

determining whether the average second parameter is greater than a predetermined value; and downgrading the coding complexity in response to a determination that the average second parameter is greater than the predetermined value.

15. The non-transitory computer-readable storage medium of claim 12, wherein the operations further comprise:

determining an average value of the first parameters recorded in the time queue and obtaining an average first parameter; and determining whether the coding complexity parameter is to be adjusted to upgrade the coding complexity based on the average first parameter and a reference average coding time period, wherein the reference average coding time period is an average value of a plurality of average first parameters corresponding to a plurality of times when the coding complexity parameter is downgraded.

* * * * *